United States Patent
Yoshie

[19]
[11] Patent Number: 5,947,359
[45] Date of Patent: Sep. 7, 1999

[54] DEVICE FOR HOLDING A PORTABLE TELEPHONE

[75] Inventor: Norio Yoshie, Toyota, Japan

[73] Assignee: Kojima Press Industry Co., Ltd., Aichi-ken, Japan

[21] Appl. No.: 09/099,607

[22] Filed: Jun. 18, 1998

[30] Foreign Application Priority Data

Jun. 25, 1997 [JP] Japan .................................... 9-169181

[51] Int. Cl.$^6$ ..................................................... B60R 11/02
[52] U.S. Cl. ........................... 224/570; 224/552; 224/553; 224/554; 224/929; 379/455; 379/446; 248/316.4
[58] Field of Search .................................... 224/539, 545, 224/548, 552, 553, 554, 567, 570, 571, 929, 558, 555; 379/426, 446, 454, 455; 248/222.11, 222.12, 316.1, 316.2, 316.3, 316.4

[56] References Cited

U.S. PATENT DOCUMENTS

| | | | |
|---|---|---|---|
| 2,579,878 | 12/1951 | Stone | 379/455 X |
| 4,776,553 | 10/1988 | Kobayashi | 224/929 X |
| 5,187,744 | 2/1993 | Richter | 224/570 X |
| 5,825,874 | 10/1998 | Humphreys et al. | 379/455 X |
| 5,832,082 | 11/1998 | Nagai | 379/455 X |

FOREIGN PATENT DOCUMENTS

| | | | |
|---|---|---|---|
| 585011 A1 | 3/1994 | European Pat. Off. | 224/929 |
| 634308 A1 | 1/1995 | European Pat. Off. | 224/929 |
| 85949 | 4/1991 | Japan | 379/455 |
| 4-213679 | 8/1992 | Japan . | |
| 406037875 | 2/1994 | Japan | 379/426 |

*Primary Examiner*—Gregory M. Vidovich
*Attorney, Agent, or Firm*—McAulay Nissen Goldberg Kiel & Hand, LLP

[57] ABSTRACT

A device for holding a portable telephone including a body element suitable for being attached to a desired position in a vehicle compartment, a holder element pivotally hinged to an end of the body element and having a longitudinal telephone holding surface on which a portable telephone is placed, a pair of holding elements attached to the holder element and urged to mutually spaced positions by a first spring exhibiting a first resilient force, so as to be moved toward a position pinching the portable telephone, and a pair of slidable members attached to the body element and urged toward a mutually approached position by a second spring exhibiting a second resilient force stronger than the first resilient force of the first spring, the pair of holding elements and the pair of slidable elements being engaged by engaging projections formed in the holding elements and having inclined side faces acting as an actuator to actuate either the movement of only the holding elements or both of the holding and slidable elements in response to a change in the size of the portable telephone placed on the holder element.

6 Claims, 8 Drawing Sheets

DEVICE FOR HOLDING A PORTABLE TELEPHONE

BACKGROUND OF THE INVENTION

1. Field of the Invention

The present invention relates to a device for holding a portable telephone or a cellular phone and, more particularly, relates to a device for removably holding a cellular phone, used preferably but not exclusively in a passenger compartment of a vehicle.

2. Description of the Related Art

Portable telephones including cordless phones, land mobile radiotelephones, personal handy phone systems, and transceivers have recently come into wide use and, thus, there are may different examples of the use of portable telephones. For example, the portable telephones are used by drivers and passengers in auto vehicles. However, it is usually difficult to obtain a mounting place suitable for stably holding a portable telephone set within a vehicle compartment. Thus, many devices have been provided to be attached to an appropriate position in a vehicle compartment in order to hold a portable telephone stably while the vehicle is moving and to permit a driver or a vehicle passenger to easily pick up the phone and to put it back.

Japanese Registered Utility Model Application No. 3017540 discloses a typical example of a conventional device for holding a portable telephone.

FIGS. 7A, 7B, and 8 illustrate the telephone holding device disclosed in Japanese Registered Utility Model Application No. 3017540.

As shown in FIG. 8, the conventional telephone holding device includes a holder member 1 and a base member 2. It will be understood from FIG. 7A that the holder member 1 has an upper plate member 1a and a lower plate member 1b connected to the upper plate member 1a by screws, a width adjusting arm 3 cooperating with a swing support 4, a holding button 5, and a stopper portion 6 to permit the portable telephone to be placed, in a standing position, therein. The portable telephone is laid on the upper plate member 1a and is stably held by the width adjusting arm 3 and the swing support 4 when it is not being used. The width adjusting arm 3 is arranged to be slidable within the holder member 1 so as to adjust the position of the arm 3 with regard to the holder member 1. The adjusted arm 3 can be fixed to the holder member 1 by screws (not shown). The swing arm 4 includes two support projections 4a and 4b integrally formed with a support arm 4c which is pivotally attached to the upper plate member 1a by a pin 7 as shown in FIG. 7b. The support arm 4c of the swing arm 4 is elastically urged by a spring 8 toward the opposite width adjusting arm 3 as shown by an arrow "A".

The holding button 5 is arranged to be projected from and retracted into the inside of the upper plate member 1a via a small window formed in the surface of the upper plate member 1a. The projection and retraction of the holding button 5 is operated by an activating mechanism arranged inside the holder member 1, so as to prevent or release the swinging motion of the width adjusting arm 3.

The stopper portion 6 is arranged to be turnable and to take either an outer position coming out of the inside of the holder member 1, or an inner position retracted into the inside of the holder member 1, via an aperture formed in one end of the upper plate member 1a. The stopper portion 6 is turned toward the outer position, when the holder member 1 is used in a substantially standing position, in order to vertically support the lower end of the portable telephone held in the holder member 1.

Referring to FIG. 8, the base member 2 is provided for fixing the holder member 1 to a desired mounting position within a vehicle compartment. The holder member 1 has a rear face 1b provided with a pair of engaging projections 10 which are engaged in a pair of receiving holes 11 formed in an upper face of the base member 2. When the engaging projections 10 are engaged in the receiving holes 11 of the base member 2, the holder member 1 is fixedly connected to the base member 2 which is suitably fixed to a desired position within a vehicle compartment.

In order to allow the holder member 1 to surely hold a portable telephone, a lateral space between the width adjusting arm 3 and the swing arm 4 of the holder member 1 must be preliminarily adjusted depending on the size of the telephone by adjustably shifting the width adjusting arm 3 against the swing arm 4 before the holder member 1 shown in FIG. 7A is fixed to the base member 2. After the adjustment of the space between the width adjusting arm 3 and the swing arm 4, when the portable telephone is placed on the holder member 1, the holding button 5 is pushed by the telephone toward inside the holder member 1 and, accordingly, the swing arm 4 is allowed to freely move. Therefore, the swing arm 4 is turned around the pin 7 toward the width adjusting arm 3 by the spring force of the spring 8. Thus, the portable telephone is resiliently held between the width adjusting arm 3 and the swing arm 4.

On the other hand, when the portable telephone is removed from the holder member 1, the telephone is moved by a telephone user to be laterally urged toward the swing arm 4, and to press the latter against the spring force of the spring 8. Therefore, the swing arm 4 is moved in a direction away from the width adjusting arm 3, and accordingly, the lateral space between the width adjusting arm 3 and the swing arm 4 is increased permitting the telephone to be easily taken out of the holder member 1. The removal of the portable telephone from the holder member 1 allows the holding button 5 to return to its position stopping the swing arm 4. As a result, the holder member 1 moves to a waiting position for receiving the portable telephone.

Nevertheless, the above-described conventional assembly of the telephone holder member 1 and the base member 2 has such a defect that when a different type of portable telephone having a different lateral width is to be held by the holder member 1, the lateral space between the width adjusting arm 3 and the swing arm 4 must be re-adjusted and fixed so as to be able to surely hold the different portable telephone. The adjusting and fixing of the width adjusting arm 3 requires cumbersome operation. For example, if a person who is a portable telephone user borrows a car from another person, and if he wishes to put his telephone on a holder member 1 attached to the borrowed car, he needs to adjust the width adjusting arm 3 of a holder member 1, so that the holder member 1 fits the size of his telephone.

Further, in the case of a business-use car or a rental car, many unspecified persons using different types of portable telephones may wish to put their telephones on the holding device attached to the business car or the rental car. As a result, the same problem as the above-mentioned adjusting problem occurs.

The above-mentioned adjusting problem might be solved by incorporating an electric motor and a position sensing devices into a device for holding a portable telephone. Namely, the incorporation of the electric motor and the position sensors will enable it to automatically adjust the lateral space between the width adjusting arm and the swing arm of the telephone holding device. Nevertheless, the use of the electric motor and the position sensors surely brings about an increase in the manufacturing cost of the telephone holding device. In addition, the use of the electric motor requires an electric power source. Thus, an additional load must be applied to a car battery.

Thus, a request has arisen for an improved portable telephone holding device to hold various portable telephones having various sizes without any cumbersome adjusting and fixing operations before the device is used for holding a portable telephone having a specified size.

SUMMARY OF THE INVENTION

An object of the present invention is to provide a device for holding a portable telephone which can eliminate all problems encountered by the conventional portable telephone holding devices.

Another object of the present invention is to provide a device for holding a portable telephone irrespective of the type and size of the telephone and requiring no need for a particular adjusting operation.

A further object of the present invention is to provide a device, for holding a portable telephone, which fits various types of portable telephones sold in a market.

In accordance with the present invention, there is provided a device, for holding a portable telephone, adapted for being attached to a desired position within a vehicle compartment, which comprises:

a body element having a longitudinal upper surface, and an opposite longitudinal rear face suitable for being attached to the desired position of a vehicle compartment by a fixing means;

a holder element having a longitudinal holding surface extending along a longitudinal axis for receiving a portable telephone thereon, said holder element being pivotally attached to the upper surface of the body element to be allowed to move up and down;

a pair of holding members arranged in substantially a face-to-face relation with one another and assembled in a portion of the holder element to be slidable toward one another in a predetermined direction with respect to the longitudinal axis of the holder element for holding the portable telephone therebetween, the pair of holding members being constantly urged apart from one another by a first spring means exhibiting a first resilient force to define a space through which the portable telephone can be placed on the holding surface of the holder element;

an engaging projection means provided to be integral with each of the pair of holding members and projecting substantially downward from the holding member, said engaging projection defining an engaging face portion thereof;

a pair of slidable members arranged in the upper surface of said body element to be slidable in a direction parallel with the predetermined direction, said slidable members being provided with an engaging portion able to be in a slidable contact-engagement with the engaging face portions of the engaging projection means provided for the pair of holding members, said slidable members being urged toward one another by a second spring means exhibiting a second resilient force larger than the first resilient force of the first spring means; and an actuating means for first actuating an initial movement of the pair of holding members directing toward one another against the first resilient force of the first spring means until the holding members are prevented from moving toward one another, in response to placing the portable telephone onto the holder element while pressing the holder element toward the body element, said actuating means actuating a second movement of the pair of holding members together with the pair of slidable members against the second resilient force of the second spring means in a direction reverse to the direction of the initial movement from a position where the holding members are prevented from moving toward one another, in response to a further pressing of the holder element by the portable telephone.

Preferably, the actuating means includes an inclined side face formed in the engaging projection means of each of the pair of holding members, the inclined side face of the engaging projection means being inclined downwardly and inwardly in a plane perpendicular to the longitudinal axis of the holder element.

Preferably, the device for holding a portable telephone further comprises a locking means arranged between the holder element and the body element for forming a locking condition between both elements when the portable telephone is completely held on the holder element.

Further preferably, the holder element of the device for holding a portable telephone is provided with a recess formed therein to receive an electric connector attached to an electric cable means.

BRIEF DESCRIPTION OF THE DRAWINGS

The above and other objects, features and advantages of the present invention will be made more apparent from the ensuing description of the preferred embodiments thereof, with reference to the accompanying drawings wherein.

DESCRIPTION OF THE PREFERRED EMBODIMENTS

Figure 1:
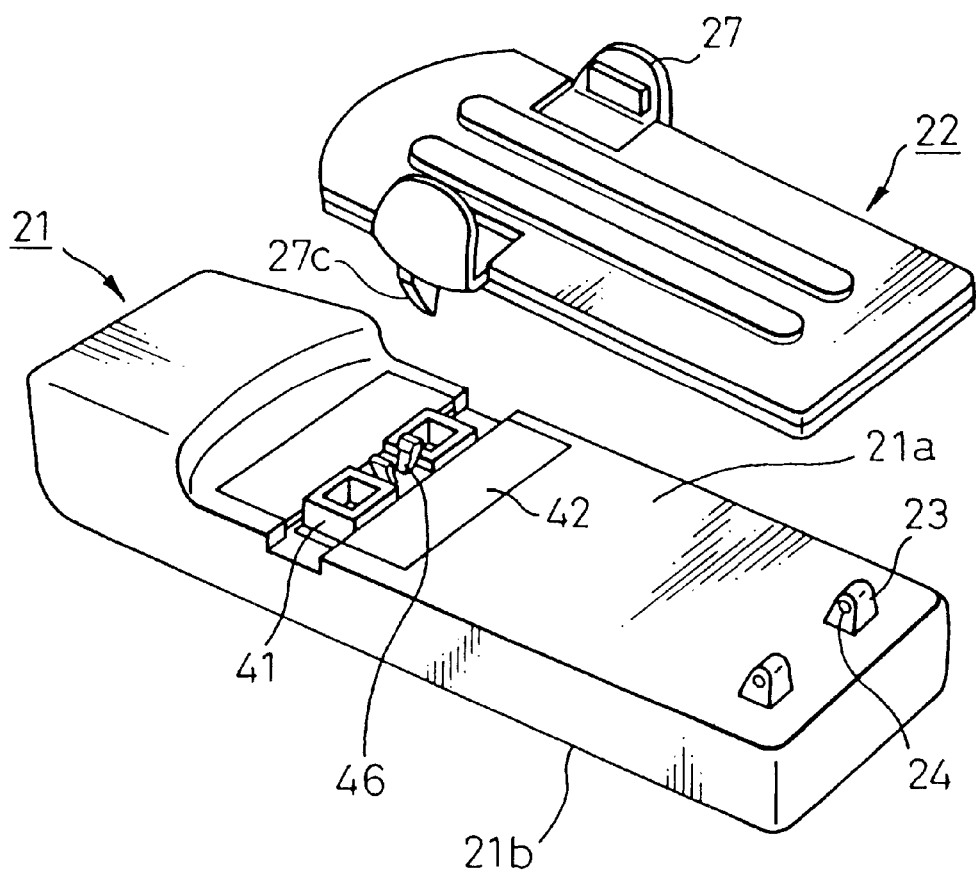
FIG. 1 is an exploded perspective view of a device for holding a portable telephone, according to an embodiment of the present invention.

Referring to FIG. 1, a device for holding a portable telephone according to a first embodiment includes a body element 21 and a holder element 22 pivotally attached to the body element 21. The body element 21 and the holder element 22 are preferably made of a plastic material.

The body element 21 has an upper surface 21a, and an opposite rear face 21b which is used for attaching the body element 21 to a desired position of a vehicle compartment via suitable conventional fixing means such as screws, adhesive and a double-coated pressure-sensitive adhesive tape. The upper surface 21a of the body element 21 is provided at one end thereof with a pair of laterally spaced bosses 23 fixedly formed thereon and having a pair of hinge holes 24 formed therein. The body element 21 is also provided in a portion thereof with a later-described movable latch 46 operative to grasp and release a locking pawl (not shown in FIG. 1) of the holder element 22.

The holder element 22 is provided with a later-described pair of hinge pins 34 formed to be slidably fitted in the hinge holes 24 of the body element 21. Thus, when the holder element 22 is assembled with the body element 21, the hinge pins 34 of the holder element 22 are inserted into the hinge holes 24 of the body element 21, so that the holder element 22 is able to perform a pivotal up-and-down motion around the hinge pins 34.

The holder element 22 is also provided with a later-described locking pawl 45 (not appearing in FIG. 1) provided in the rear face thereof so as to cooperate with the movable latch 46 of the body element 21. It should be understood that when the locking pawl 45 of the holder element 22 is grasped by the movable latch 46 of the body element 21, the holder element 22 is locked by the body element 21, and that when the locking pawl 45 is released from the movable latch 46, the holder element 22 is free to pivot about the hinge pins 34 thereof relative to the body element 21.

Figure 2:
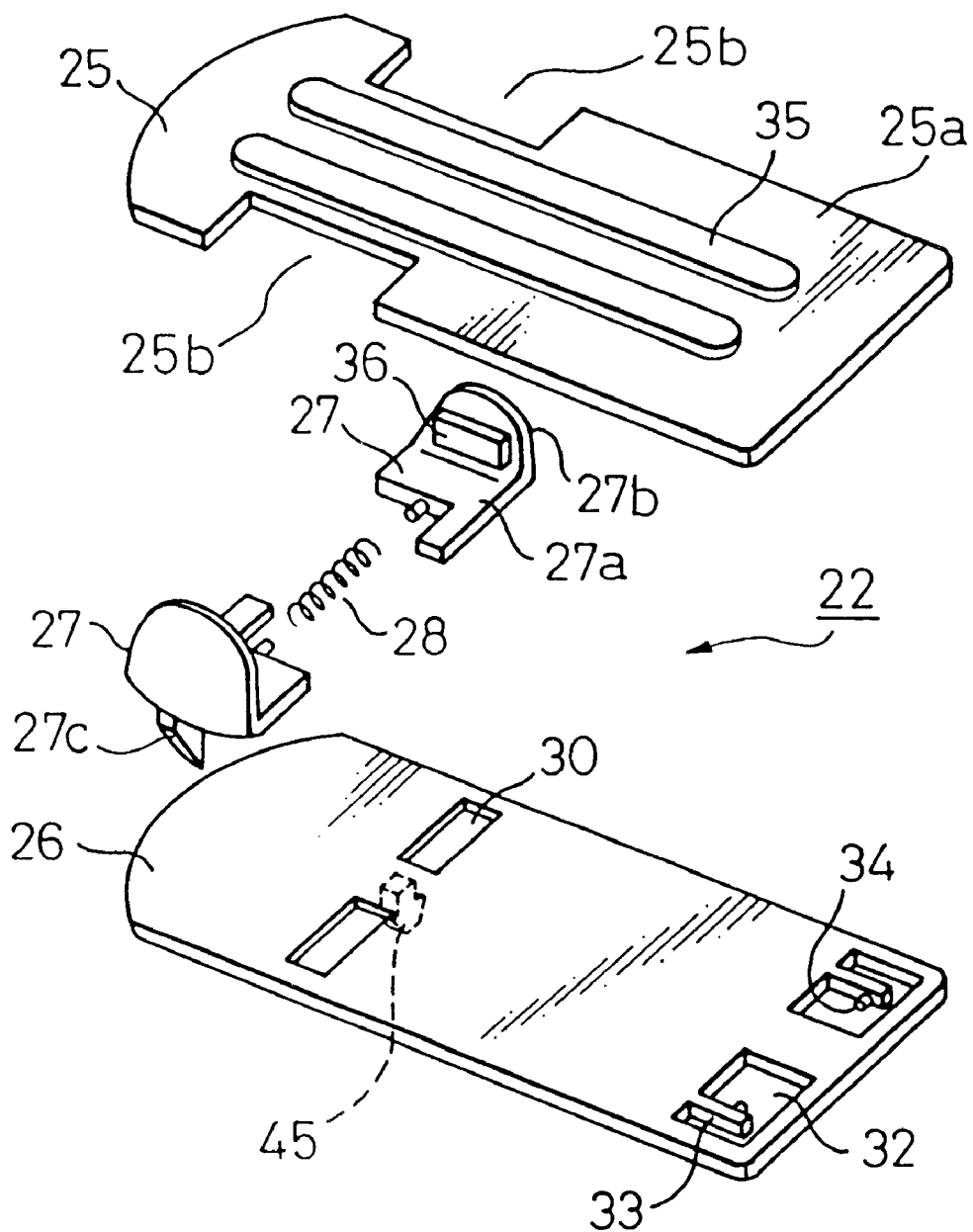
FIG. 2 is an exploded perspective view of a holder element of the embodiment of FIG. 1.

Referring to FIG. 2 as well as FIG. 1, the holder element 22 includes an upper plate 25, a lower plate 26, a pair of holding members 27, 27, and a spring element 28 (a first spring means) in the form of a coil spring capable of exhibiting a predetermined resiliency. The upper plate 25 is a flat plate member which includes a longitudinal upper surface 25a having a front round end, an opposite rear end, and a pair of laterally spaced cut portions 25b, 25b. The longitudinal upper surface 25a of the upper plate 25 functions as a telephone holding surface.

The lower plate 26 is also a plate member having an outer shape substantially corresponding to that of the upper plate 25. The lower plate 26 is provided with a pair of apertures 30 formed at a position thereof shifted from a longitudinally central position thereof toward its round front end, a different pair of apertures 32 at a position adjacent to the rear end thereof, and a pair of elastic legs 33 formed and arranged in the apertures 32. The elastic legs 33 extend in parallel with a longitudinal central axis of the lower plate 26, and are provided with a pair of lateral hinge pins 34 formed so as to be slidably fitted in the afore-mentioned hinge holes 24 of the boss 23 of the body element 21. The lower plate 26 is further provided with the afore-mentioned locking pawl 45 formed integrally in the rear face thereof.

Each of the holding members 27 is provided with a substantially horizontal sliding portion 27a, a vertical holding portion 27b, and an engaging portion 27c formed as an integral portion with the sliding portion 27a and projecting downward from the horizontal sliding portion 27a.

The first spring means 28 is arranged between the horizontal sliding portions 27a of the pair of holding members 27 to exhibit a predetermined resilient force urging the two holding members 27 to move apart from one another. The horizontal sliding portions 27a of the two holding members 27 and the first spring means 28 are assembled between the upper and lower plates 25 and 26 which may be connected together by a conventional connecting means such as screws, adhesive, and a pressure-sensitive adhesive coated tape. When the above-mentioned pair of holding members 27 are assembled between the upper and lower plates 25 and 26, the engaging projections 27c are arranged in the pair of apertures 30 of the lower plate 26, so that the engaging projections 27c project downward from the rear face of the holder element 22. Thus, the vertical holding portions 27b of the holding members 27 project upward from the holder member 22, and are constantly laterally urged apart from one another by the resilient force of the first spring means 28. It should be understood that the holding members 27 can be moved toward one another when a pressing force larger than the predetermined resilient force of the first spring means 28 is applied to the holding members 27.

When the holder element 22 is assembled with the body element 21 by fitting the afore-mentioned hinge pins 34 of the lower plate 26 in the hinge holes 24 of the bosses 23 of the body element 21, the holder element 22 is hinged to the body element 21, and accordingly, the holder element 22 can pivot about the hinge pins 34 relative to the body element 21.

The upper plate 25 of the holder element 22 and the vertical portions 27b of the holding members 27 are provided with soft pads 35 and 36 made of a suitable conventional soft plastic material or rubber material. The soft pads 35 are attached to the upper surface by means of connecting means such as adhesive or a pressure-sensitive adhesive coated tape in order to protect a portable telephone from damage when the telephone is placed on the surface of the upper plate 25 of the holder element 22. Similarly, the soft pads 36 are attached to the inner faces of the vertical portions 27b of the two holding members 27. The soft pads 36 also contribute to protecting the portable telephone placed between the two holding members 27 from being damaged.

Figure 3:
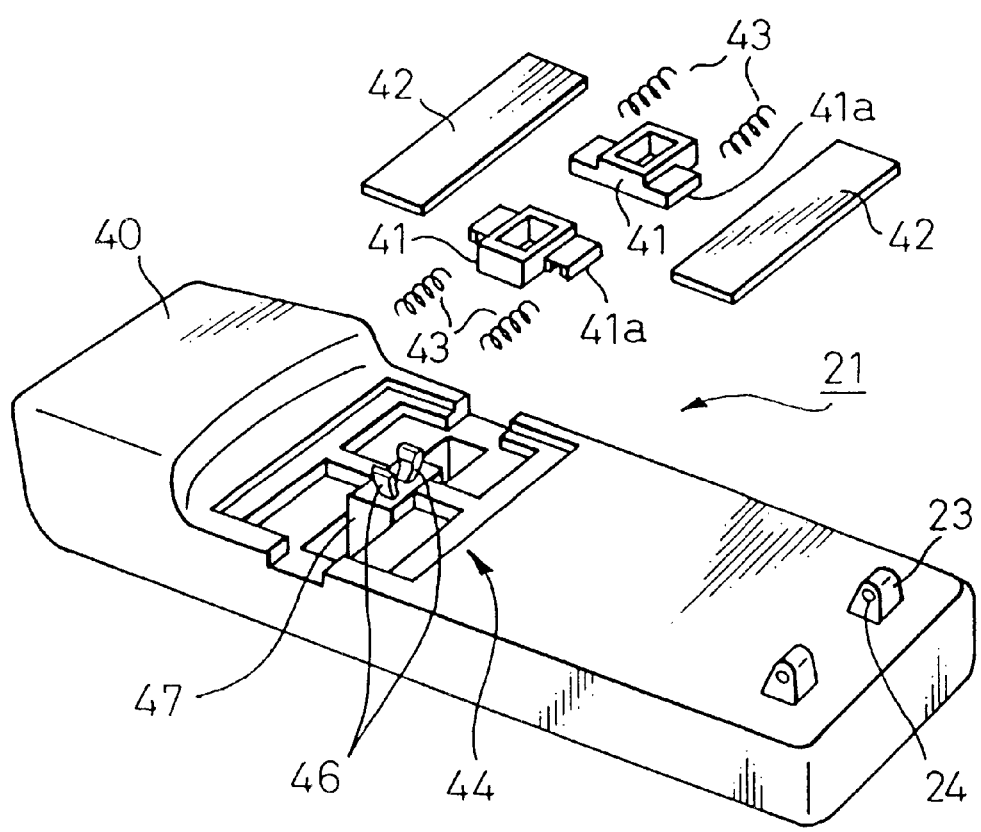
FIG. 3 is an exploded perspective view of a body element of the embodiment of FIG. 1.

Referring to FIG. 3, the body element 21 includes a casing 40, two slidable members 41, 41 formed as open ended hollow members, two fixing plates 42, 42, four spring elements 43 operating as a second spring means, and the afore-mentioned movable latch 46. The casing 40 formed as a generally parallelepiped box member has a mount 44 formed in an upper surface thereof to slidably mount thereon the two slidable members 41, 41. Namely, when the two slidable members 41 are mounted on the mount 44, wings 41a formed in both sides of each slidable member 41 are slidably held between the upper surface of the mount 44 and the fixing plates 42. Thus, the slidable members 41 can be slid in a lateral direction with respect to a longitudinal central axis of the casing 40. The fixing plates 42 are fixed to the mount 42 by means of suitable fixing means such as screws, adhesive, and a pressure sensitive adhesive coated tape.

When the slidable members 41 are mounted in the mount 44 of the casing 40, the spring elements 43 are also assembled in the mount 44 of the casing 40 in a manner such that the two spring elements 43 are arranged between the side walls of the casing 40 and the wings 41a of each of the two slidable members 41. The four spring elements 43 constitute the second spring means which constantly resiliently urges the two slidable members 41 toward one another along a lateral axis perpendicular to the longitudinal central axis of the body element 21 until the two slidable members 41 are in contact with a central stop post 47. It should be understood that the resilient force exhibited by the second spring means is predetermined so as to be larger than the predetermined resilient force exhibited by the first spring 28 of the holder element 22.

The two slidable members 41 are moved away from one another and from the central stop post 47 when an external drive force overcoming the resilient force exhibited by the second spring means including the four spring elements 43 is applied to the two slide members 41.

The central stop post 47 of the casing 40 of the body element 21 houses therein the afore-mentioned movable latch 46 which can be moved between an upper releasing position where the latch 46 is disengaged from the locking pawl 45 of the holder element 22 and a lower grasping position where the latch 46 grasps the locking pawl 45 of the holder element 22. At this stage, it should be understood that when the holder element 22 hinged with the body element 21 is fully moved down toward the upper surface of the body element 21, i.e., the upper surface of the casing 40, the locking pawl 45 of the holder element 22 pushes the movable latch 46 until the pawl 45 is grasped by the lowered latch 46. Thus, the holder element 22 is locked by the body element 21 through the engagement of the pawl 45 and the latch 46.

When the holder element 22 in its locking position is pushed downward by an external force while allowing the locking pawl 45 of the holder element 22 to move the movable latch 46 downward, and when the external pushing force applied to the movable latch 46 via the locking pawl 45 is removed, the movable latch 46 is moved back to its upper releasing position by a non-illustrated latching and unlatching mechanism accommodated in the interior of the casing 40 of the body element 22. Although the latching and unlatching mechanism is not material to the present invention, it is to be noted that the latching and unlatching mechanism may be constituted by any one of the various known locking mechanisms such as one disclosed in Japanese Unexamined Patent Application Publication No. 4-213679 publicly disclosed on Aug. 4, 1992.

The description of the operation of the device for holding a portable telephone according to the first embodiment will be provided hereinbelow with reference to FIGS. 4A through 5B.

Figure 4A:
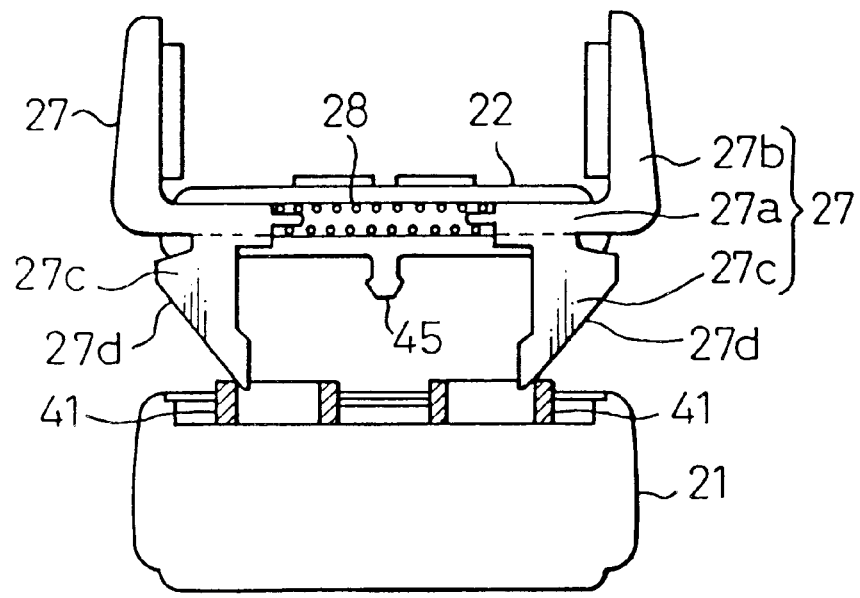
FIGS. 4A and 4B are schematic side views, in part cross-section, of the device of FIG. 1, illustrating the cooperation of the holder member and the body element.
Figure 4B:
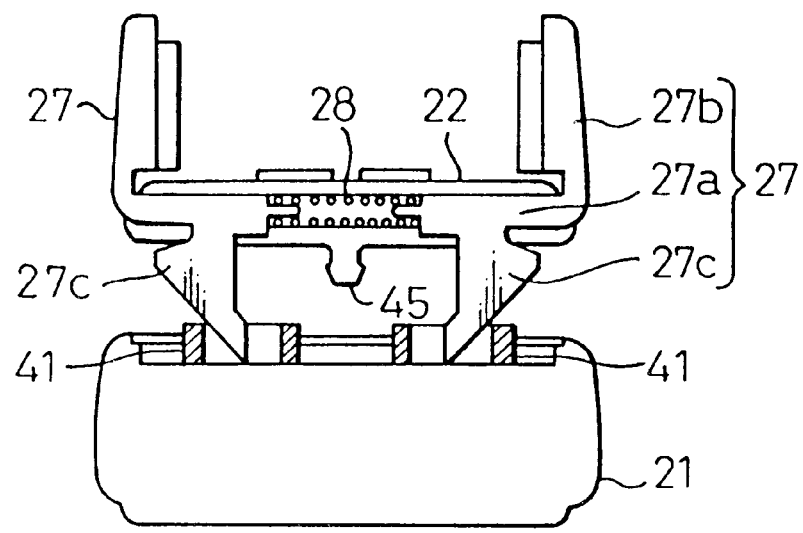

FIGS. 4A and 4B illustrate the telephone holding device of the first embodiment which is in a condition where no portable telephone is received in the holder element 22. In the state shown in FIG. 4A, the pair of holding members 27 having the holding portions 27b and the engaging portions 27c are spaced apart from one another at the furthest apart position thereof due to the resilient force of the first spring means 28.

On the other hand, the two slidable members 41 of the body element 21 are moved toward one another to come to the nearest together position due to the resilient force of the second spring means (the four spring elements 43). The engaging portions 27c of the pair of holding members 27 of the holder element 22 come into contact with the pair of slidable members 41 of the body element 21, and the weight of the holder element 22 is sustained by the contacting portion of the holding members 27 of the holder element 22 and the slidable elements 41 of the body element 21. The engaging portions 27c of the holding members 27 are provided with inclined side faces 27d shown in FIGS. 4A and 4B which are in contact with the upper ends of the two slidable members 41 being formed as open ended hollow members, respectively.

Nevertheless, it should be noted that since the spring stiffness of the first and second spring means 28 and 43 is preliminarily designed to be so strong that the weight of the holder element 22 loaded to the contacting portion of the holding members 27 and the sliding elements 41 does not change the length of the first spring means 28 and the second spring means 43.

When the holder element 22 is pressed down into the body element 21 from the state of FIG. 4A by an application of a pressing force, the holder element 22 is pivoted about the hinge pins 34 (FIG. 2) and the inclined side faces 27d of the two holding members 27 are gradually slid into the inside of the two open ended hollow slidable members 41 to come to the different position shown in FIG. 4B.

In the state shown in FIG. 4B, the two slidable members 41 stay at the same positions as those shown in FIG. 4A. However, the two holding members 27 are laterally moved toward one another from the position shown in FIG. 4A due to the shrinkage of the first spring means 28. It should be noted that the movement of the two holding members 27 toward one another against the first spring means 28 is actuated by the inclined side faces 27d of the holding members 27. This is because the resilient force of the first spring means 28 is smaller than that of the second spring means 43. Any further movement downward of the holder element 22 from the position of FIG. 4B toward the body element 21, caused by applying an additional external force to the holder element 22, will cause only a closing movement of the two holding members 27 while leaving the slidable elements 41 at their positions shown in FIG. 4B.

When the holder element 22 is further moved from the position of FIG. 4B toward the body element 21 by an application of a further external pressing force, the locking pawl 45 of the holder element 22 pushes the movable latch 46 of the body element 21 downward. Latch 46 is not shown in FIGS. 4A and 4B to simplify the view. Thus, the locking pawl 45 is grasped by the movable latch 46 as soon as the application of the external force is removed. Thus, the holder element 22 is locked to the body element 21.

When the locking of the holder element 22 with the body element 21 is to be released, an external force is applied to the holder element 22 so as to press it toward the body element 21, and the external force is immediately removed. As a result, the movable latch 46 of the body element 21 returns to its upward unlocking position where the locking pawl 45 of the holder element 22 is disengaged from the movable latch 46. Therefore, the resilient force of the first spring means 28 acts on the holding members 27 so as to move them in a direction away from one another. Thus, the inclined side faces 27d of the engaging portions 27c contacting the upper ends of the slidable elements 41 actuate an upward movement of the holder element 22 toward the position shown in FIG. 4A. Namely, the inclined side faces 27d of the engaging portions 27c of the holding members 27 act as an actuator to cause the return of the holder element 22 from the lowermost locking position thereof to the uppermost released position thereof.

Figure 5A:
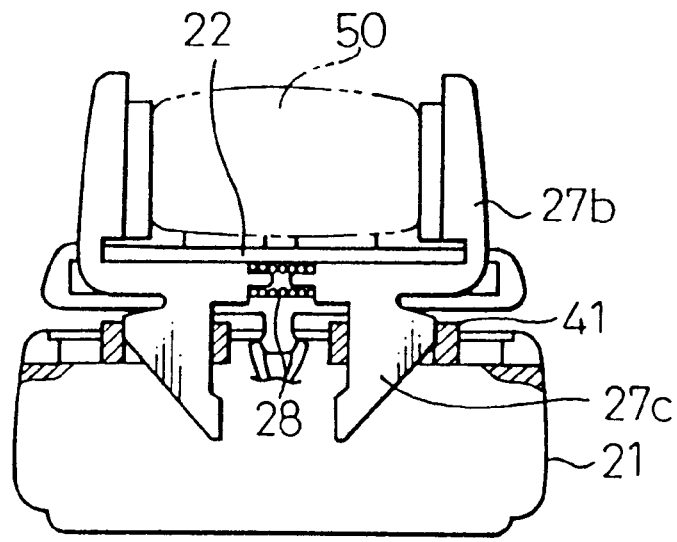
FIG. 5A is a schematic side view, in part cross-section, of the device of FIG. 1, illustrating a telephone holding state in which a relatively small portable telephone is held by the holder element.

FIG. 5A illustrates the telephone holding device of the first embodiment which holds a relatively small portable telephone.

When it is required that a portable telephone, e.g., a small portable telephone 50 is held by the holder element 22, the portable telephone 50 is initially placed on the upper plate 25 of the holder element 22 which is maintained at the position shown in FIG. 4A. Subsequently, a telephone user, e.g. a vehicle driver pushes the holder element 22 toward the body element 21 via the portable telephone placed on the upper plate 25. Thus, the holder element 22 is allowed to pivot about its hinge pins 34 fitted in the hinge holes 24 of the body element 21 from the position of FIG. 4A toward that of FIG. 4B. Accordingly, the holding members 27 are moved toward one another due to the contacting engagement of the inclined side faces 27d of the engaging portions 27c of the holding members 27 and the open ended hollow slidable element 41, and eventually pinch the small portable telephone 50 therebetween. When the holder element 22 is pivoted to move down to the lowest position thereof, the locking pawl 45 of the holder element 22 comes to a position ready for being grasped by the movable latch 46 of the body element 21 and, as soon as the pressing force applied to the holder element 22 via the small portable telephone 50 is removed, the holder element 22 is locked by the body element 21. Thus, the small portable telephone 50 is stably held by the telephone holding device.

When the small portable telephone 50 is removed from the holder element 22 of the telephone holding device, a pressing force is applied by the telephone user to the holder element 22 via the portable telephone 50 in order to move the movable latch 46 of the body element 21 down. Then, the pressing force is quickly removed so as to return the movable latch 46 to its upper position releasing the locking pawl 45 of the holder element 22. Thus, the holder element 22 is disengaged from the body element 21, and is moved back to the position shown in FIG. 4A. Therefore, the portable telephone 50 pinched by the holding portions 27b of the holding members 27 is released by the resilient force of the first spring means 28, and can be easily removed from the holder element 22.

Figure 5B:
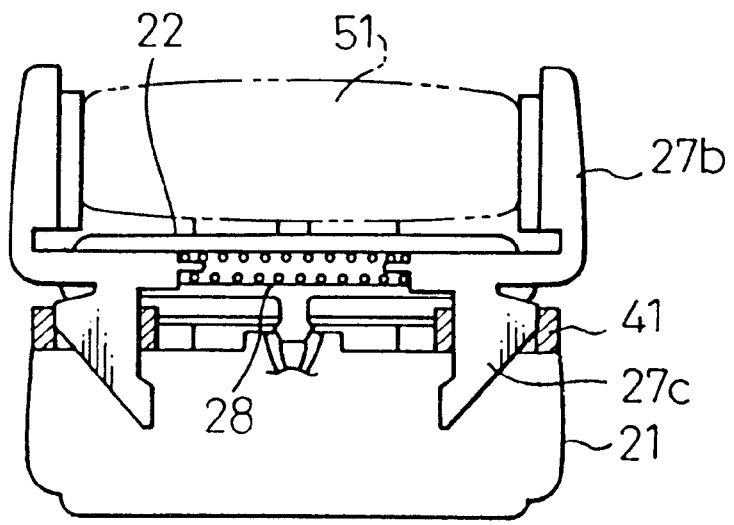
FIG. 5B is a schematic side view, in part cross-section, of the device of FIG. 1, illustrating a telephone holding state in which a relatively large portable telephone is held by the holder element.

FIG. 5B illustrates the telephone holding device of the same embodiment, which holds a relatively large portable telephone.

When it is required that a large portable telephone 51 be held by the holder element 22, a user of the large portable telephone 51 implements a telephone placing process identical to that described above with respect to the small portable telephone 50 by referring to FIG. 5A. Nevertheless, the movement of the holding portions 27b of the two holding members 27 to hold the large portable telephone 51 is different from the afore-mentioned movement for holding the small portable telephone. Namely, when the large telephone 51 is initially placed on the holder element 22 maintained at the position shown in FIG. 4A, and as soon as a pressing force is applied to the holder element 22 via the telephone 51, the two holding members 27 are immediately moved to a position where the holding portions 27b are in contact with the large portable telephone 51. Then, even if the application of the pressing force to the holder element 22 is continued by the telephone user, the two holding members 27 are prevented from moving toward one another due to the existence of the large portable telephone between the members 27. Alternately, the pair of open ended hollow slidable elements 41 are forced to move away from one another against the resilient force of the second spring means 43, by the actuation of the inclined side faces 27d of the engaging projections 27c of the holding members 27. Thus, the large portable telephone 51 can be placed on the upper surface 25a of the upper plate 25 of the holder element 22 and stably held by the two holding members 27. The holder element 22 is then locked to the body element 21 by the engagement of the locking pawl 45 with the movable latch 46.

Removal of the large portable telephone 51 from the telephone holding device can be achieved by the same operation as the afore-mentioned removal of the small portable telephone 50.

It should be noted that when a relatively large portable telephone 51 is placed on the holder element 22 of the device, only the first spring means 28 initially shortens so as to allow the holding members 27 to come into contact with the portable telephone, and after the holding members 27 contact the portable telephone, only the second spring means 43 having a stronger spring stiffness compared with the first spring means 28 shortens while allowing the holding members 27 and the slidable members 41 to move to the position holding the large portable telephone. Accordingly, when a relatively large portable telephone 51 is placed on the holding element 22 of the telephone holding device, the telephone user must increase the pressing force applied to the holder element 22 in order to obtain a holding space between the holding members 27 due to the sliding movement of the slidable members 41 against the resilient force of the second spring means 43. Nevertheless, it should be understood that any preliminary operation for adjusting the position of the two holding members 27 of the holder element 22 is not needed even if the size of a portable telephone to be held changes.

Figure 6A:
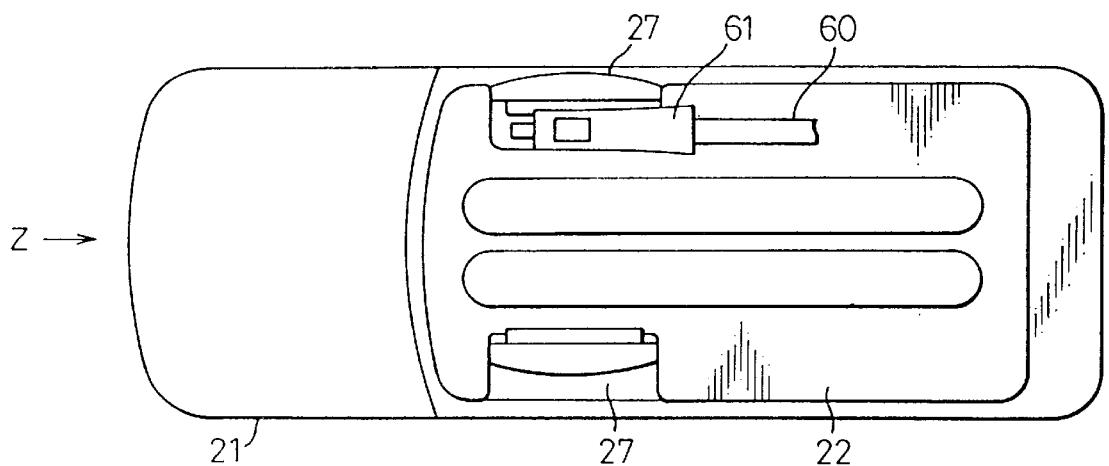
FIG. 6A is a top plan view of a device for holding a portable telephone, according to a different embodiment of the present invention.
Figure 6B:
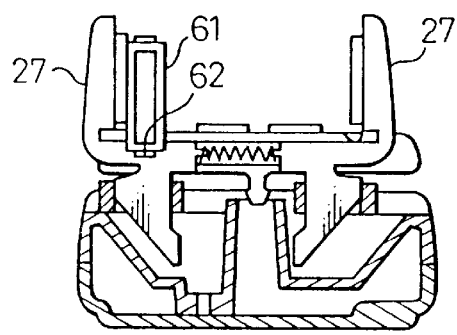
FIG. 6B is a partially cross-sectioned, side view viewed in the direction shown by an arrow "Z" of FIG. 6A.
Figure 7A:
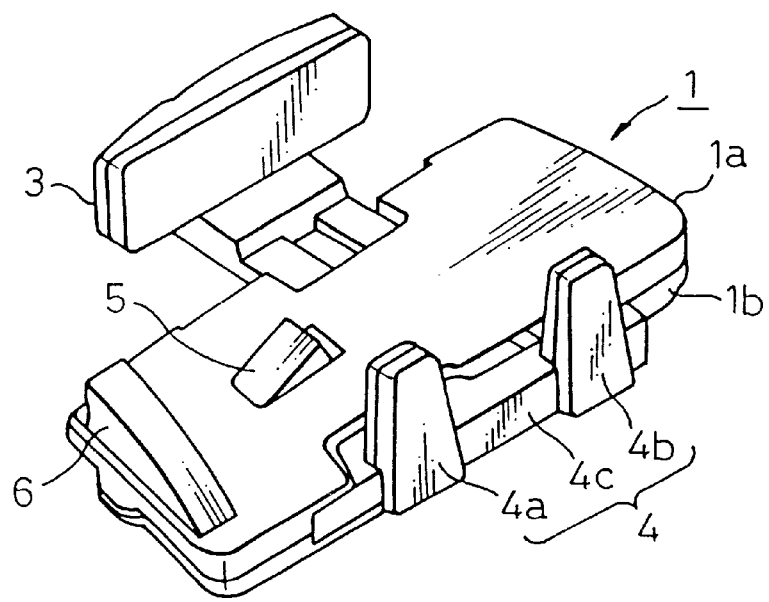
FIG. 7A is a perspective view of a holder element of a device for holding a portable telephone according to the prior art, illustrating an upper side of the holder element.
Figure 7B:
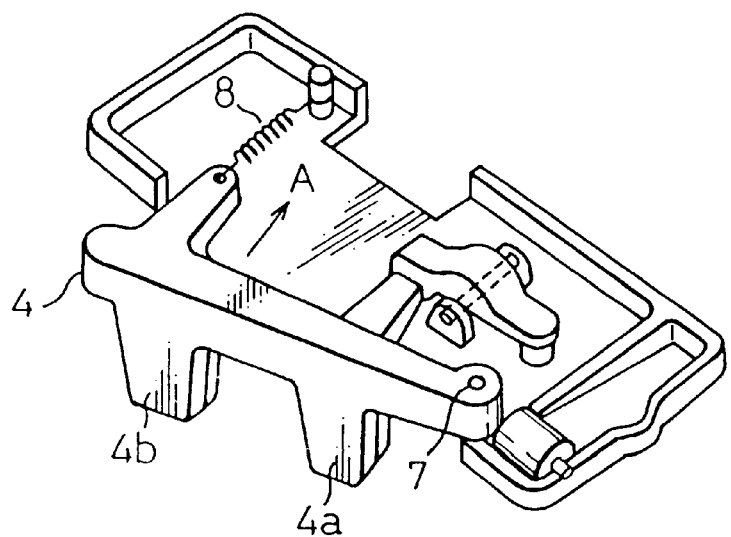
FIG. 7B is a perspective view of the holder element of FIG. 7A, illustrating a rear side of the holder element of FIG. 7A.
Figure 8:
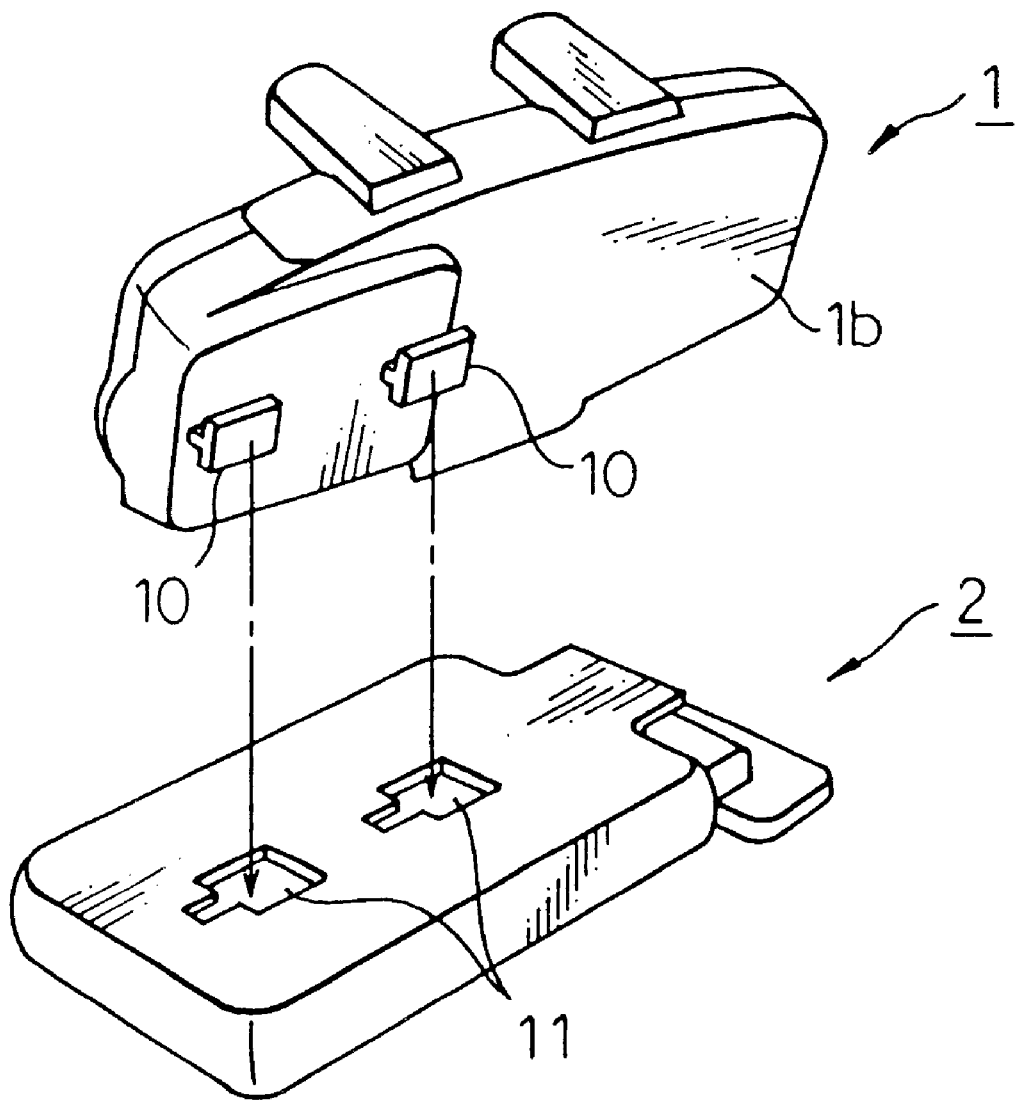
FIG. 8 is a perspective view of the holder element of FIGS. 7A and 7B, and a base to which the holder element is attached.

FIGS. 6A and 6B illustrate a telephone holding device according to a second embodiment of the present invention.

The telephone holding device of the second embodiment is different from that of the first embodiment in that the device is provided with a recess 62 formed in a portion of the holder element 22. Namely, the recess 62 is provided for holding an electric connector 61 in place, which is attached to an end of a cable 60 extending from e.g., an electric power source and an antenna system. Thus, when a portable telephone is placed on the holder element 22, electric power may connected to a battery housed in the telephone as required. Further, the portable telephone may be connected to a vehicle antenna system as required.

From the foregoing description of the preferred embodiments of the present invention, it will be understood that the telephone holding device according to the present invention can be used for holding a portable telephone irrespective of the size of the portable telephone without any particular adjustment of the position of the holding members of the telephone holding device. Further, since the telephone holding device of the present invention is constructed to be easily mounted in a desired position such as a control panel within a vehicle passenger compartment, a vehicle driver or a vehicle passenger may conveniently use the telephone holding device.

It should be understood that many and various changes and modifications can be made by a person skilled in the art without departing the scope and spirit of the present invention as defined by the accompanying claims.

What I claim is:

1. A device for holding a portable telephone, adapted to be attached to a desired position in a vehicle passenger compartment, comprising:

a body element having a longitudinal upper surface, and an opposite longitudinal rear face suitable for being attached to the desired position of the vehicle compartment;

a holder element having a longitudinal holding surface extending along a longitudinal axis for receiving a portable telephone thereon, said holder element being pivotally attached to said upper surface of said body element to be allowed to move up and down;

a pair of holding members arranged substantially in a face-to-face relation to one another and assembled in a portion of said holder element to be slidable toward one another in a predetermined direction with respect to the longitudinal axis of said holder element for holding the portable telephone therebetween, said pair of holding members being constantly urged apart from one another by a first spring means exhibiting a first resilient force to define a space through which the portable telephone is allowed to be placed on said holding surface of said holder element;

an engaging projection means provided to be integral with each of said pair of holding members and projecting substantially downward from said holding members, each said engaging projection means defining an engaging face portion thereof;

a pair of slidable members arranged in said upper surface of said body element to be slidable in a direction parallel with said predetermined direction, each of said slidable members being provided with an engaging portion to be in a slidable engagement with said engaging face portions of said engaging projection means provided for said pair of holding members, said slidable members being urged toward one another by a second spring means exhibiting a second resilient force larger than the first resilient force of said spring means; and an actuating means for first actuating an initial movement of said pair of holding members toward one another against said first resilient force of said first spring means until said holding members are prevented from moving toward one another upon engagement with the telephone, in response to placing the portable telephone onto said holder element while pressing said holder element toward said body element, said actuating means, dependant on the size of the telephone, further actuating a first movement of said pair of slidable members against the second resilient force of said second spring means in a direction reverse to the direction of the initial movement of a said pair of holding members, in response to a further pressing of said holder element.

2. The device as claimed in claim 1, wherein said actuating means comprises each of said face portions defining an inclined side face, each said inclined side face being inclined downwardly and inwardly in a plane perpendicular to the longitudinal axis of said holder element.

3. The device as claimed in claim 1, further comprising:

a latching means arranged between said holder element and said body element for forming a latching condition between both of said elements when the portable telephone is held on said holder element.

4. The device as claimed in claim 1, wherein said holder element is provided with a recess formed therein to receive an electric connector attached to an electric cable.

5. The device as claimed in claim 1, wherein said pair of slidable members comprise a pair of open ended hollow members placed on a mount arranged in said longitudinal upper surface, and a fixing plate means for slidably holding the slidable members on said mount, each of said pair of open ended hollow members being provided with wings suitable for being slidably held between said mount of said body element and said fixing plate means.

6. The device as claimed in claim 1, wherein said holder element is provided with soft pads attached to said longitudinal holding surface thereof, and wherein said pair of holding members are provided with soft pads attached thereto.

* * * * *